(12) United States Patent
Saenger et al.

(10) Patent No.: US 12,021,685 B2
(45) Date of Patent: **\*Jun. 25, 2024**

(54) ADAPTIVE VIRTUAL SERVICES

(71) Applicant: Level 3 Communications, LLC, Broomfield, CO (US)

(72) Inventors: Adam Saenger, Castle Pines, CO (US); Matthew Holway, Round Tree, VA (US); Len Brannen, Evergreen, CO (US); Gene Clark, Marysville, OH (US); Anil Simlot, Sterling, VA (US); Zubin Ingah, Centennial, CO (US); Johan J. Shane, Newton, MA (US); Michael Gibson, Evergreen, CO (US); Cory Sawyer, Hudson, MA (US); Rich Cerami, Denver, CO (US); Kurt Deshazer, Larkspur, CO (US)

(73) Assignee: Level 3 Communications, LLC, Broomfield, CO (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/144,392

(22) Filed: May 8, 2023

(65) Prior Publication Data

US 2023/0275806 A1 Aug. 31, 2023

Related U.S. Application Data

(63) Continuation of application No. 17/698,259, filed on Mar. 18, 2022, now Pat. No. 11,646,936, which is a
(Continued)

(51) Int. Cl.
*H04L 41/0813* (2022.01)
*G06F 8/61* (2018.01)
(Continued)

(52) U.S. Cl.
CPC ........... *H04L 41/0813* (2013.01); *G06F 8/62* (2013.01); *G06F 9/45558* (2013.01);
(Continued)

(58) Field of Classification Search
CPC ............ H04L 41/0813; H04L 41/0806; H04L 41/046; H04L 41/0869; H04L 41/0895;
(Continued)

(56) References Cited

U.S. PATENT DOCUMENTS

2010/0119050 A1 5/2010 Kuo
2015/0052610 A1\* 2/2015 Thom ................... G06F 21/575
726/24
(Continued)

*Primary Examiner* — Azizul Choudhury

(57) ABSTRACT

Examples of the present disclosure describe systems and methods relating to adaptive virtual services. In an example, a user specifies a device configuration for a platform device. As a result, a service provider installs selected virtual-network functions and defines network connections as specified by the device configuration. Management software may also be installed, thereby enabling the service provider to communicate with and remotely manage the platform device. The installed virtual-network functions are activated on the platform device once it is delivered to the user. In some instances, the user changes the device configuration. For example, the user may install new virtual-network functions, reconfigure or remove existing virtual-network functions, or change defined network connections. As a result, the service provider reconfigures the platform device accordingly. Thus, the user need not purchase new specialized hardware in order to change the available functions of the computer network.

12 Claims, 7 Drawing Sheets

Related U.S. Application Data continuation of application No. 16/905,453, filed on Jun. 18, 2020, now Pat. No. 11,283,678.

(60) Provisional application No. 62/862,846, filed on Jun. 18, 2019.

(51) Int. Cl.
*G06F 9/455* (2018.01)
*G06F 21/60* (2013.01)
*H04L 12/46* (2006.01)
*H04L 41/0806* (2022.01)

(52) U.S. Cl.
CPC ........ *G06F 21/602* (2013.01); *H04L 12/4641* (2013.01); *H04L 41/0806* (2013.01); *G06F 2009/45595* (2013.01)

(58) Field of Classification Search
CPC ... H04L 12/4641; G06F 8/62; G06F 9/45558; G06F 9/44505; G06F 21/602; G06F 21/572; G06F 2009/45595
See application file for complete search history.

(56) References Cited

U.S. PATENT DOCUMENTS

| | | | |
|---|---|---|---|
| 2017/0373939 A1* | 12/2017 | Liu | H04L 63/08 |
| 2020/0186427 A1* | 6/2020 | Chunduru Venkata | H04L 9/0877 |
| 2020/0249975 A1* | 8/2020 | Shankara Murthy | H04L 41/0806 |
| 2020/0403864 A1 | 12/2020 | Saenger | |
| 2022/0210014 A1 | 6/2022 | Saenger | |

\* cited by examiner

ADAPTIVE VIRTUAL SERVICES

BACKGROUND

Different devices may each provide one or more functions. Accordingly, multiple such devices can be interconnected to provide a specific set of functions in a computer network. However, the use of multiple devices introduces additional complexity to the setup and maintenance of the network and may also limit potential functionality upgrades or changes in the future. For example, a device may need to be replaced or a new device may need to be incorporated into the network in order to change the available functions of the computer network.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods relating to adaptive virtual services. In an example, a user specifies a device configuration for a platform device, wherein the device configuration comprises one or more virtual-network functions and network connections, as well as virtual-network-function-configuration information. A service provider configures the platform device according to the device configuration. As an example, the service provider uses a device-staging manager and a domain orchestrator to install the virtual-network functions and define the network connections specified by the device configuration. In examples, management software is installed, which enables the service provider to communicate with the platform device once it has been deployed. Once the platform device is delivered to the user premises, the installed virtual-network functions are activated on the platform device accordingly.

In some instances, the user changes the device configuration. For example, the user may install new virtual-network functions, or reconfigure or remove existing virtual-network functions. The user may also change defined network connections for the platform device. The service provider may communicate with the installed management software to reconfigure the platform device accordingly. As a result, the user need not purchase new specialized hardware in order to change the available functions of the computer network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description that follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

In some instances, multiple specialized devices are used to provide a network having a specific set of functions. For example, a routing device, a firewall device, and a software-defined wide area network (SD-WAN) device are each used to provide their respective functions within the network. However, as a result of using such specialized devices, each device must be interconnected to the other devices in a specific way within the network, thereby complicating the initial setup and maintenance of the network. Additionally, such devices are typically not interchangeable or easily upgradeable. Accordingly, altering, adding, or removing functionality within the network typically requires exchanging, adding, or removing such specialized devices. This reduces flexibility and limits the potential for functionality upgrades in the future (e.g., as a business grows, as needs change, etc.) and may result in increased expense (e.g., as a result of repeatedly buying new hardware to replace old hardware), unnecessary delays (e.g., while waiting for new hardware to arrive, while waiting for an information technology professional to install and configure new hardware, etc.), and needless complexity, among other detriments.

Accordingly, aspects disclosed herein relate to adaptive virtual services. In an example, a platform device is used to provide one or more virtual-network functions. The platform device is configurable to add, remove, or change virtual-network functions. As a result, the functionality of an associated computer network is more easily changed as compared to examples in which multiple specialized devices are used. Aspects described herein further provide for user configuration of such platform devices. Rather than requiring an information technology professional to manually design and subsequently set up a network comprised of numerous specialized devices, a user is able to employ a user computing device to specify a device configuration for a platform device. Using the device configuration, a service provider configures the platform device accordingly. Additionally, the user may later change the device configuration, such that the configuration of the platform device is updated according to the changed device configuration.

Figure 1A:
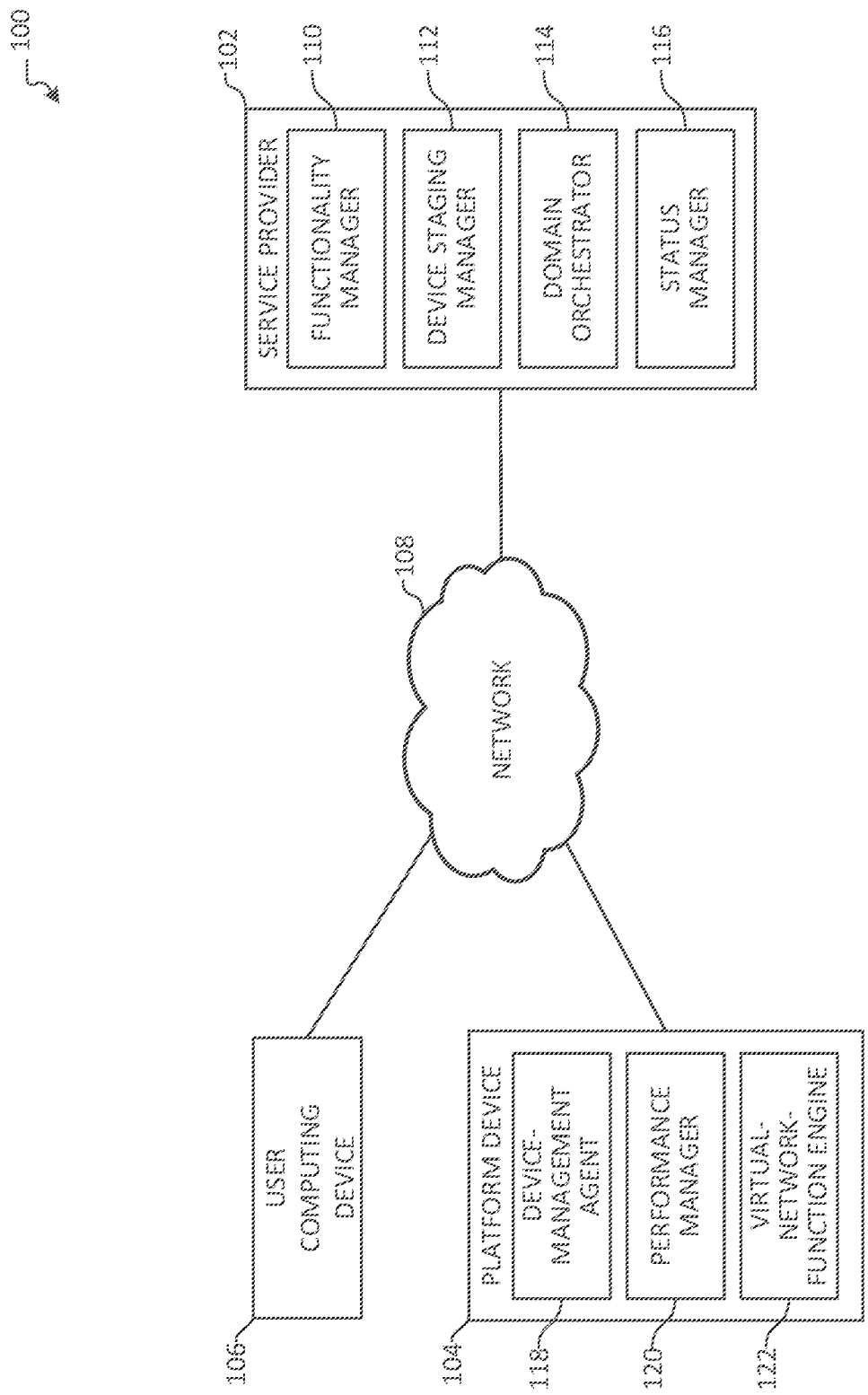
FIG. 1A illustrates an overview of an example system in which aspects of adaptive virtual services may be practiced.

FIG. 1A illustrates an overview of an example system 100 in which aspects of adaptive virtual services may be practiced. As illustrated, system 100 comprises service provider 102, platform device 104, and user computing device 106. Service provider 102, platform device 104, and user computing device 106 are illustrated as communicating through network 108. Network 108 may comprise a local area network, a wide area network, and/or the Internet, among other examples. User computing device 106 may be any of a variety of computing devices, including, but not limited to, a mobile computing device, a tablet computing device, a laptop computing device, or a desktop computing device. It will be appreciated that, while system 100 is described with respect to one platform device 104 and one user computing device 106, any number of such devices may be used in other examples. In examples, platform device 104 may be located at the premises of a user, at an edge node of a communications network, and/or at a cloud service provider, among other examples.

In examples, service provider 102 configures platform devices, such as platform device 104. As illustrated, service provider 102 comprises functionality manager 110, device-staging manager 112, domain orchestrator 114, and status manager 116. Functionality manager 110 is used to select and modify the functionality of a platform device, as may be defined by a device configuration according to aspects described herein. For example, a device configuration describes a set of virtual-network functions, network connections (e.g., a mapping of a virtual-network function to one or more physical network connections, a virtual network connection between a set of virtual-network functions, etc.), and configuration information (e.g., user account information, network configuration information, etc.).

Functionality manager 110 may provide a user interface with which to configure a platform device (e.g., via a website, an application executed by a computing device such as user computing device 106, etc.). Functionality manager 110 may be used to select a set of virtual-network functions from a library of available virtual-network functions for inclusion on a platform device. For example, the library of virtual-network functions comprises functions provided by service provider 102, as well as one or more third parties. As an example, service provider 102 may validate third-party virtual-network functions for inclusion in the library, wherein validated functions have been evaluated to confirm that they conform to certain standards and do not exhibit incompatibility with other virtual-network functions. Example virtual-network functions include, but are not limited to, routing functionality, firewall functionality, SD-WAN functionality, or print-server functionality. In some examples, a user specifies a custom virtual-network function (e.g., as may be developed or otherwise provided by the user) that is not otherwise available from the library. As an example, the custom virtual-network function may comprise point of sale functionality or media streaming functionality, among other examples. A virtual-network function may be assigned to a platform device by dragging a visual representation of the virtual-network function to a visual representation of the platform device. Similarly, functionality manager 110 may be used to define a network connection associated with a selected virtual-network function. As an example, a network connection may be "drawn" between selected virtual-network functions and/or between available hardware network connections, or any combination thereof. While example virtual-network functions are described herein, it will be appreciated that any of a variety of other functionality may be provided in the form of a virtual-network function. Additionally, it will be appreciated that other user-interface techniques may be used to assign virtual-network functions and/or define network connections.

In examples, functionality manager 110 validates a device configuration specified by a user. For example, functionality manager 110 determines that each virtual-network function is associated with at least one physical or virtual network connection and identifies incompatibilities between the set of selected virtual-network functions. In some examples, functionality manager 110 accesses a database of available platform-device types. As used herein, a platform-device type defines a set of specifications associated with a platform device including, but not limited to, device manufacturer, processor clock speed/number cores, storage capacity, memory capacity, networking capabilities, operating system, and/or installed software packages. Functionality manager 110 may use the available platform-device types to determine whether a platform device is capable of providing the selected set of virtual-network functions. For example, a platform device may have insufficient storage, processing power, and/or memory to provide the set of virtual-network functions. Accordingly, functionality manager 110 may generate an indication to select a different platform device or to add another platform device to provide additional compute capabilities. If the device configuration is validated, the device configuration may be stored. In some instances, the device configuration is associated with a specific physical location, such as an address or a branch location. The user may indicate that the device configuration should be duplicated, in some examples modified, and used for a different location. In examples, status manager 116 is used to monitor an order status associated with one or more device configurations. For example, status manager 116 may indicate whether a platform device has been staged, shipped, and/or activated successfully. Thus, a user may use user computing device 106 to view status information generated by status manager 116.

Once a device configuration has been saved, a platform device may be identified and configured accordingly. In examples, the platform device is identified based on an association between a platform device and the device configuration. The association may be generated based on an indication received from a user (e.g., a user located at a warehouse may assign a platform device in inventory to a device configuration) or may be generated automatically. In examples, the identified platform device is platform device 104.

Device-staging manager 112 may validate specifications associated with platform device 104 and, where possible, correct specification mismatches. For example, if platform device 104 has the wrong operating system version or is missing a software package, device-staging manager 112 may install a different operating system or install the missing software package, among other examples.

Device-staging manager 112 may download one or more software images associated with selected virtual-network functions, as specified by the device configuration. For example, a virtual-network function is packaged in a container or as a virtual machine. Device-staging manager 112 may install management software, such as device-management agent 118 and performance manager 120. In examples, device-management agent 118 and performance manager 120 are provided in a similar format as is used for virtual-network functions (e.g., in a container, as a virtual machine, etc.). In another example, device-staging manager 112 generates device-specific cryptographic data, which enables platform device 104 and service provider 102 to communicate. For example, cryptographic keys may be generated, which may later be used by device-management agent 118 to form an Internet Protocol Security (IPsec) tunnel between platform device 104 and service provider 102. The IPsec tunnel may be used to provide performance information (e.g., as may be generated by performance manager 120), such as processor load, free disk space, or memory utilization, etc. As another example, the IPsec tunnel may be used to install, remove, or reconfigure virtual-network functions (which may be performed by device-management agent 118). The cryptographic data may also uniquely identify platform device 104, which enables service provider 102 to verify that it is communicating with an authorized platform device. In some examples, device-staging manager 112 configures Secure Shell (SSH) access, among other administrative or configuration tools.

In examples, device-management agent 118 communicates with functionality manager 110 to indicate that platform device 104 has been initialized by device-staging manager 112. As a result, domain orchestrator 114 is used to further configure platform device 104. As an example, domain orchestrator 114 installs the virtual-network functions that were downloaded to platform device 104 by device-staging manager 112. For example, domain orchestrator 114 may unpack files, generate system services, and define network connections as specified by the device configuration. In examples, domain orchestrator 114 performs such operations using commands that are specific to a platform-device type. For example, a platform device may be provided from the manufacturer with a specific application programming interface (API), which domain orchestrator 114 may use to configure platform device 104. As another example, platform device 104 may have a specific operating system variant installed, such that a specific set of command line instructions is used for that operating system variant as compared to another operating system variant. In some instances, instructions to perform the above-discussed configuration operations are received by domain orchestrator 114 from functionality manager 110. Domain orchestrator 114 may confirm operations are completed as expected and, upon failure, may rollback configuration as necessary. As a result of domain orchestrator 114 implementing the type-specific aspects discussed above, functionality manager 110 need not consider the platform-device type when issuing such instructions. Thus, domain orchestrator 114 offers a level of abstraction between platform device 104 and functionality manager 110.

Once domain orchestrator 114 finishes configuring the platform device, domain orchestrator 114 provides an indication to functionality manager 110. In examples, an indication is provided that platform device 104 is ready to ship. As a result, platform device 104 may be powered down and shipped. Eventually, platform device 104 is powered on at the premises of a customer. Accordingly, device-management agent 118 uses the cryptographic data generated by device-staging manager 112 to generate an IPsec tunnel between platform device 104 and service provider 102. Device-management agent 118 generates an indication that platform device 104 is at the customer premises. As a result, functionality manager 110 instructs domain orchestrator 114 to activate platform device 104, such that the virtual-network functions installed on platform device 104 are activated. As an example, domain orchestrator 114 instructs virtual-network-function engine 122 to execute one or more containers or virtual machines. In some instances, device-management agent 118 may perform additional configuration steps. As an example, device-management agent 118 may install a custom virtual-network function from an on-premises data store (e.g., a server computing device, a removable storage device, etc.).

In examples, a user changes the configuration of platform device 104. For example, the needs of the user may change as a result of adding additional computing devices, additional users, or desiring different functionality. Accordingly, the user employs user computing device 106 to communicate with functionality manager 110 of service provider 102. Similar to the user interface described above, a user interface is used to alter the functionality of platform device 104. For example, the user adds a virtual-network function to platform device 104 by dragging a virtual-network function from a library to a graphical representation of platform device 104. As another example, the user may drag a virtual-network function away from platform device 104 to remove it. Functionality manager 110 validates the changed device configuration of platform device 104 (e.g., in response to receiving a save indication, after a change made by the user, etc.).

In some examples, functionality manager 110 determines that the changed device configuration is not suited for the specifications of platform device 104. For example, platform device 104 may not have enough memory, storage space, network interfaces, and/or processing power for the changed device configuration. As a result, functionality manager 110 may generate an indication for display to the user that platform device 104 is unsuitable for the changed device configuration. In examples, the indication comprises an option to revert back to the previous device configuration. As another example, the user is offered the option to order a platform device to replace platform device 104 (e.g., of a type that has more capable specifications, such as more memory, more processing cores, a higher clock speed, etc.) or to order a platform device to supplement the capabilities of platform device 104. In examples where a replacement or an additional platform device is selected, the platform device is configured by service provider 102 according to aspects described herein.

Once the changed device configuration is validated, functionality manager 110 saves the device configuration. Functionality manager 110 instructs domain orchestrator 114 to update the configuration of platform device 104 accordingly. For example, domain orchestrator 114 communicates with device-management agent 118 of platform device 104 in order to reconfigure an installed virtual-network function, download and install a new virtual-network function, uninstall a virtual-network function, remove a network connection, or define a new network connection, among other examples. Device-management agent 118 and domain orchestrator 114 may communicate using an IPsec tunnel according to aspects described herein. The user may view the status of such changes using status manager 116. For example, an indication that a new virtual-network function is being downloaded to platform device 104 may be presented to the user or, in another example, shipping information is displayed for a replacement or additional platform device, among other examples.

Platform device 104 is illustrated as comprising performance manager 120, which is used by service provider 102 to monitor the performance of platform device 104 (e.g., processor load, memory utilization, storage utilization, etc.) and diagnose issues (e.g., misconfigured software, a hardware failure, etc.). In examples, performance manager 120 provides performance information to service provider 102. It will be appreciated that another example system comprises one or more platform devices in addition to platform device 104. In such examples, another platform device can be used to provide the functionality of platform device 104 in a failure scenario, thereby providing failover capabilities. In another example, a configuration backup is stored (e.g., on a local storage device, on another platform device, etc.), such that a new platform device replacing the failed platform device is easily configured upon receipt by the user.

Figure 1B:
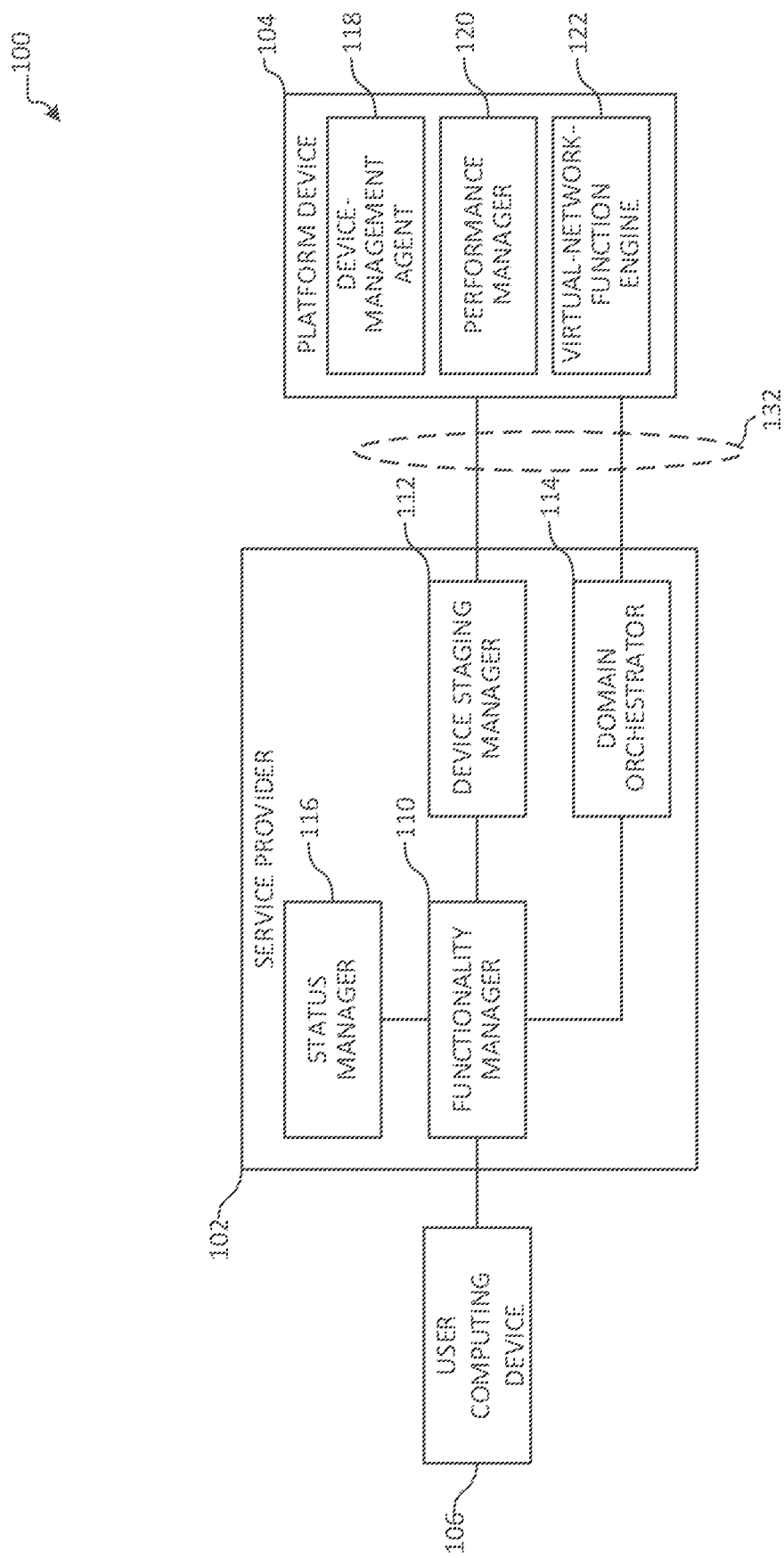
FIG. 1B illustrates another overview of the example system in FIG. 1A with which aspects of adaptive virtual services may be practiced.

FIG. 1B illustrates another overview of the example system 100 in FIG. 1A with which aspects of adaptive virtual services may be practiced. A number of elements depicted in FIG. 1B are described above in the context of FIG. 1A and, thus, are not necessarily described further. FIG. 1B is provided to illustrate how aspects described above in FIG. 1A communicate to provide the adaptive virtual services described herein.

As illustrated, user computing device 106 communicates with functionality manager 110. As described above, functionality manager 110 enables a user of user computing device 106 to configure and reconfigure platform device 104 using a user interface. In examples, functionality manager 110 communicates with status manager 116 to generate a status display with respect to a device configuration, which is provided to user computing device 106.

Functionality manager 110 communicates with device-staging manager 112 and domain orchestrator 114 in order to configure platform device 104 according to a device configuration (e.g., as is received from user computing device 106). As described above, device-staging manager 112 communicates with platform device 104 to download software images associated with selected virtual-network functions. In an example, device-staging manager 112 installs management software (e.g., device-management agent 118 and performance manager 120). In another example, device-staging manager 112 generates device-specific cryptographic data, which enables platform device 104 and service provider 102 to communicate.

Functionality manager 110 also communicates with domain orchestrator 114, which communicates with platform device 104 to further configure platform device 104 according to the device configuration. For example, domain orchestrator 114 may unpack files, generate system services, and define network connections as specified by the device configuration. As discussed above, domain orchestrator 114 may perform operations as a result of instructions received from functionality manager 110 and implements platform-device-type-specific commands such that functionality manager 110 need not consider the platform-device type when issuing such instructions. Thus, domain orchestrator 114 offers a level of abstraction between platform device 104 and functionality manager 110.

Dashed oval 132 is provided to indicate that that communications among platform device 104, device-staging manager 112, and domain orchestrator 114 may occur over a local area network (e.g., as may be the case in a warehouse when platform device 104 is initially configured) or over a tunnel (e.g., such as an IPsec tunnel, as may be the case when platform device 104 is reconfigured according to a changed device configuration). While example communication methods are described herein, it will be appreciated that any of a variety of other communication methods may be used.

Figure 2A:
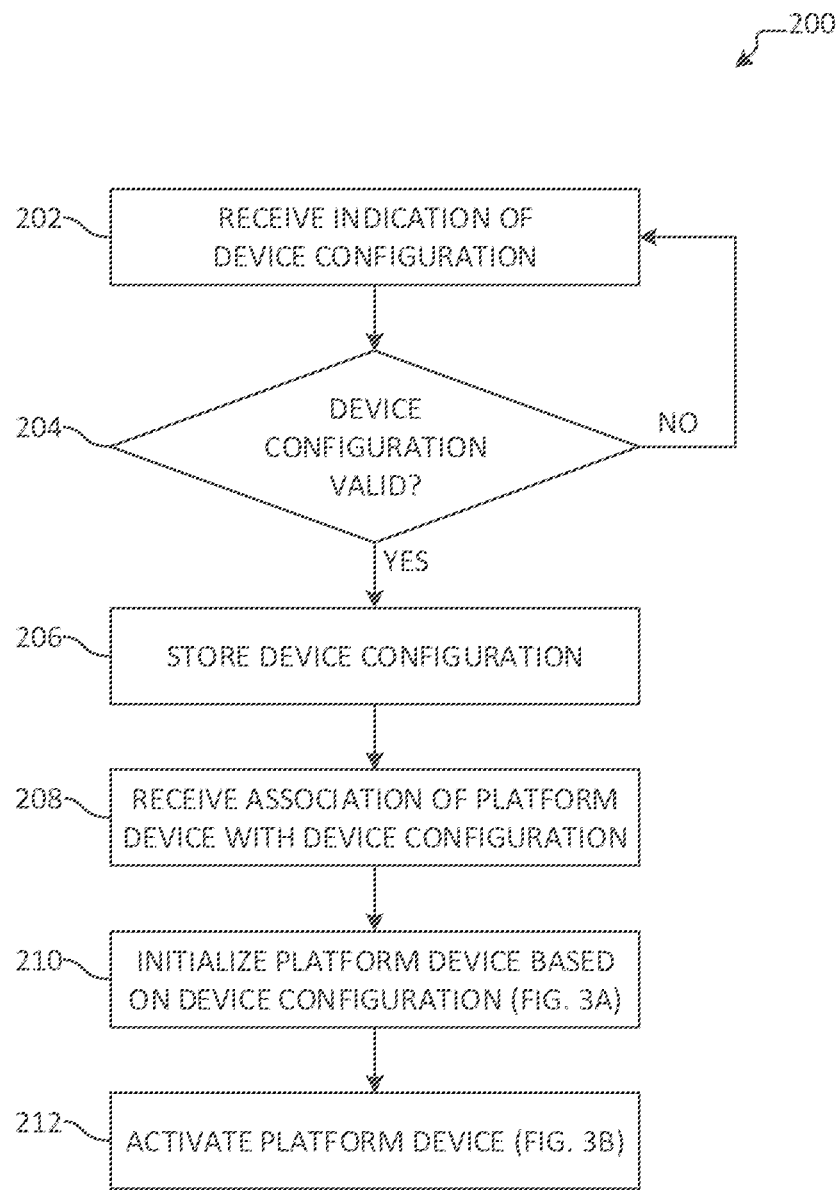
FIG. 2A illustrates an overview of an example method for processing a device configuration, initializing a platform device, and activating the platform device accordingly.

FIG. 2A illustrates an overview of an example method 200 for processing a device configuration, initializing a platform device, and activating the platform device accordingly. In examples, aspects of method 200 are performed by a service provider, such as service provider 102 in FIGS. 1A-1B. Method 200 begins at operation 202, where an indication of a device configuration is received. In examples, the indication is received as a result of a user employing a user device (e.g., user computing device 106 in FIGS. 1A and 1B) to specify the device configuration using a user interface. As described above, the device configuration may describe a set of virtual-network functions, network connections (e.g., a mapping of a virtual-network function to one or more physical-network connections, a virtual-network connection between a set of virtual-network functions, etc.), and configuration information (e.g., user account information, network-configuration information, etc.).

Flow progresses to operation 204, where it is determined whether the device configuration is valid. In examples, the determination is made by a functionality manager, such as functionality manager 110 in FIGS. 1A and 1B. As an example, virtual-network functions of the device configuration are evaluated to determine that each virtual-network function is associated with at least one physical or virtual network connection. As another example, incompatibilities between the set of selected virtual-network functions are identified. If an incompatibility is identified, the incompatibility may be automatically resolved or an indication of the incompatibility may be presented to the user. In some examples, a database of available platform-device types is evaluated to determine whether a platform device is capable of providing the selected set of virtual-network functions. If the platform device is not suitable, an indication may be generated to select a different platform device or to add another platform device to provide additional compute capabilities. If the device configuration is not valid, flow branches "NO" and returns to operation 202, where an updated device configuration is received to resolve the validation issues.

If, however, the device configuration is valid, flow instead branches "YES" to operation 206, where the device configuration is stored. For example, the device configuration may be stored using a data store of the service provider. In some examples, the device configuration is associated with an identifier associated with the user, such as a customer number, a billing address, or a branch location, among other examples.

Flow progresses to operation 208, where an association is received between a platform device and the device configuration. In examples, the association is generated based on an indication received from a user (e.g., a user located at a warehouse may assign a platform device in inventory to a device configuration) or, in other examples, the association is generated automatically (e.g., according to available inventory in a warehouse, based on identified device specifications that are suitable for the received device configuration, etc.).

At operation 210, the platform device associated with the device configuration is initialized according to the device configuration. In examples, aspects of operation 210 are performed to configure a platform device prior to shipping the platform device to the end user. In some examples, aspects of operation 210 are performed by a device-staging manager and a domain orchestrator, such as device-staging manager 112 and domain orchestrator 114 in FIGS. 1A and 1B. For example, the device specifications of the platform device are validated and specification mismatches are corrected if possible. One or more software images associated with the device configuration are downloaded and installed. As another example, cryptographic data is generated, administrative user accounts are set up, and/or management software is installed. Additional aspects are discussed below with respect to FIG. 3A.

At operation 212, the platform device is activated. In examples, aspects of operation 212 are performed once the platform device has arrived and is powered on at the location at which it will reside. Accordingly, aspects of operation 212 may be performed using a tunnel to communicate with the platform device (as may be set up by a device-management agent, such as device-management agent 118 in FIGS. 1A and 1B). Activating the platform device comprises instructing the platform device to execute the installed virtual-network functions. In examples, additional configuration steps are performed, such as installing a custom virtual-network function from an on-premises data store. Additional aspects of operation 212 are discussed below with respect to FIG. 3B. Flow terminates at operation 212.

Figure 2B:
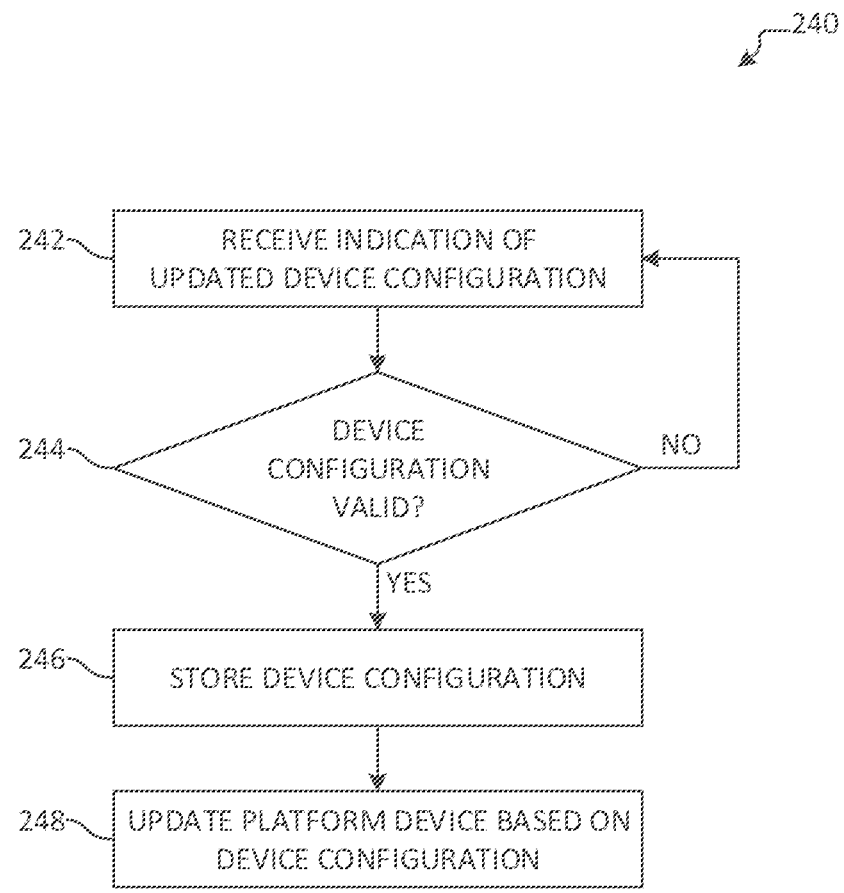
FIG. 2B illustrates an overview of an example method for processing an updated device configuration and updating the configuration of a platform device accordingly.

FIG. 2B illustrates an overview of an example method 240 for processing an updated device configuration and updating the configuration of a platform device accordingly. In examples, aspects of method 240 are performed by a service provider in response to a received device configuration update from a user computing device, such as service provider 102 and user computing device 106 in FIGS. 1A-1B. Method 240 begins at operation 242, where an indication of an updated device configuration is received. In examples, the indication is received as a result of a user employing a user device (e.g., user computing device 106 in FIGS. 1A and 1B) to specify the updated device configuration using a user interface. For example, the needs of the user may change as a result of adding additional computing devices, additional users, or desiring different functionality.

Accordingly, the updated device configuration may describe a set of virtual-network functions, network connections (e.g., a mapping of a virtual-network function to one or more physical-network connections, a virtual-network connection between a set of virtual-network functions, etc.), and configuration information (e.g., user account information, network-configuration information, etc.) for an existing platform device. In examples, the updated device configuration indicates one or more changes (e.g., an addition of a virtual network function, a subtraction of a virtual network function, or a changed network connection) or may comprise a full set of virtual-network functions, network connections, and/or associated configuration information for the platform device. Thus, it will be appreciated that any of a variety of techniques may be used to update device configuration according to aspects described herein.

Flow progresses to operation 244, where it is determined whether the updated device configuration is valid. In examples, the determination is made by a functionality manager, such as functionality manager 110 in FIGS. 1A and 1B. As an example, virtual-network functions of the updated device configuration are evaluated to determine that each virtual-network function is associated with at least one physical or virtual network connection. As another example, incompatibilities between the set of selected virtual-network functions are identified. If an incompatibility is identified, the incompatibility may be automatically resolved or an indication of the incompatibility may be presented to the user. In some examples, one or more specifications of the platform device (e.g., as may be accessed from a database of platform-device types) are evaluated to determine whether the platform device is capable of providing the updated set of virtual-network functions. If the platform device is not suitable, an indication may be generated that the platform device will be replaced with a different platform device or that another platform device will be added to provide additional compute capabilities. Example evaluations are described above with respect to operation 244 and, in some examples, a subset of such evaluations are performed depending on the set of changes indicated by the updated device configuration. If the device configuration is not valid, flow branches "NO" and returns to operation 242, where a new updated device configuration is received to resolve the validation issues.

If, however, the device configuration is valid, flow instead branches "YES" to operation 246, where the device configuration is stored. For example, the device configuration may be stored using a data store of the service provider. In some examples, the device configuration is associated with an identifier associated with the platform device and/or the user, such as a customer number, a billing address, or a branch location, among other examples.

At operation 248, the configuration of the platform device is updated according to the updated device configuration. In some examples, aspects of operation 248 are performed by a device-management agent and a domain orchestrator, such as device-management agent 118 and domain orchestrator 114 in FIGS. 1A and 1B. For example, a domain orchestrator may communicate with a device management agent of the platform device in order to update the configuration of the platform device based on the updated device configuration. Accordingly, instructions may be provided to the device-management agent to reconfigure an installed virtual-network function, download and install a new virtual-network function, uninstall a virtual-network function, remove a network connection, or define a new network connection, among other examples. As described above, communication with the device-management agent may be achieved using an IPsec tunnel or any of a variety of other communication techniques. In examples where operation 244 determined that a replacement or an additional platform device is to be configured, operation 248 may comprise causing aspects of method 200 discussed above with respect to FIG. 2 to be performed so as to configure the replacement or additional platform device accordingly. Flow terminates at operation 248.

Figure 3A:
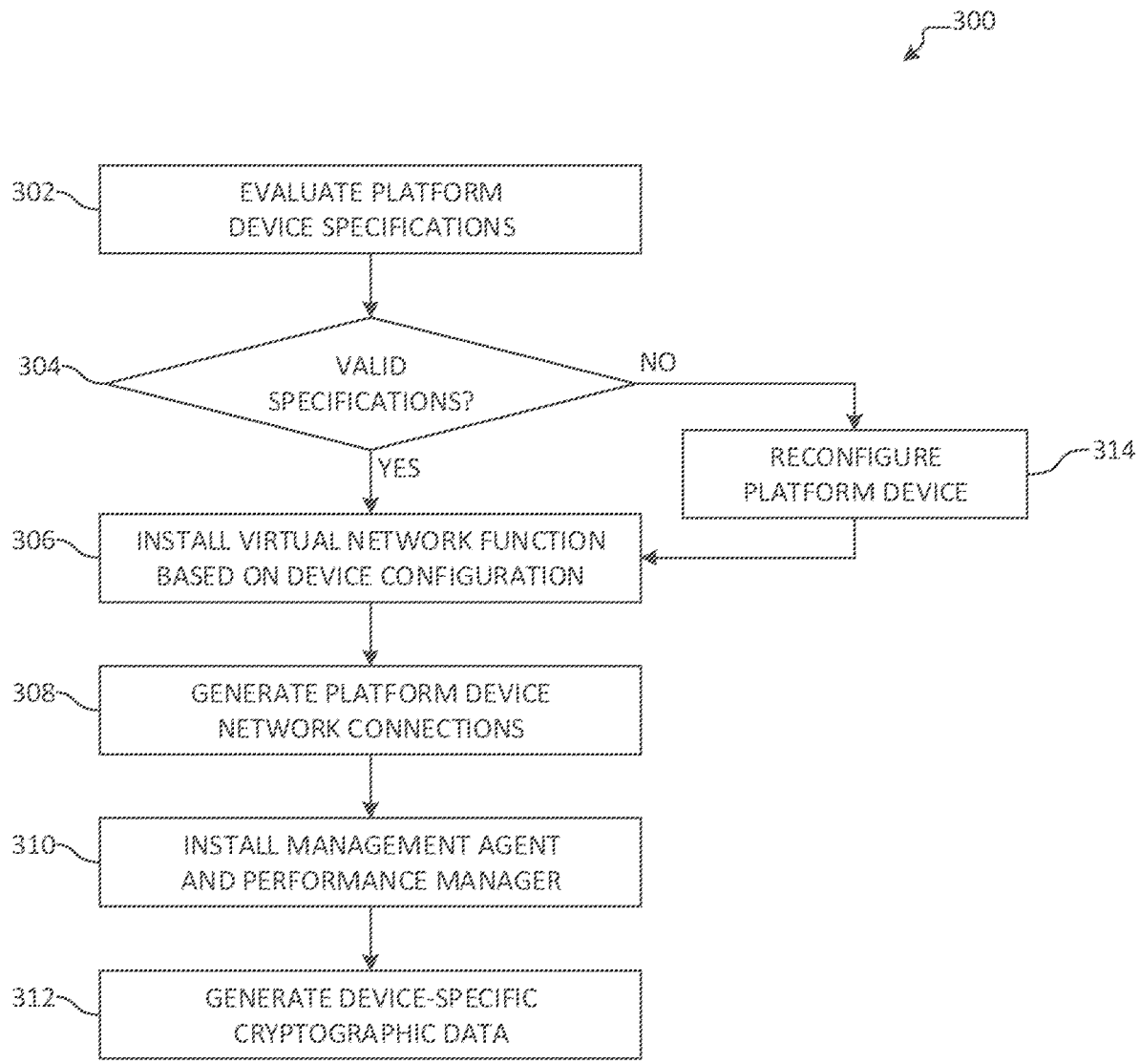
FIG. 3A illustrates an overview of an example method for initializing a platform device according to a device configuration.

FIG. 3A illustrates an overview of an example method 300 for initializing a platform device according to a device configuration. In examples, aspects of method 300 are performed by a service provider, such as service provider 102 using device-staging manager 112 and domain orchestrator 114 described above in FIGS. 1A and 1B. Method 300 may be performed to configure a platform device in a warehouse prior to shipping the platform device to a user. In some instances, aspects of method 300 are performed as part of operation 210 discussed above with respect to method 200 in FIG. 2A.

Method 300 begins at operation 302, where platform device specifications are evaluated. In examples, the specifications of a platform device are evaluated as compared to expected specifications for a platform device of the same or similar type. Example specifications include, but are not limited to, device manufacturer, processor, storage, memory, networking capabilities, operating system, and/or installed software packages.

At determination 304, it is determined whether the platform device specifications are valid. For example, if one or more specifications of the platform device do not match the expected specifications for the platform-device type, the specifications are determined to be invalid. As a result, flow branches "NO" to operation 314, where the platform device is reconfigured. As an example, a different operating system is installed or software packages are updated, among other examples. In some instances, it is not possible to reconfigure the platform device, such as in examples where the hardware specifications are incorrect. It will be appreciated that, in such instances, reconfiguring the platform device may comprise using a replacement platform device. Flow then progresses to operation 306 discussed below.

If, however, the specifications are valid, flow branches "YES" to operation 306. At operation 306, a virtual-network function is installed based on a device configuration associated with the platform device. In an example, installing the virtual-network function comprises copying one or more software packages, containers, and/or virtual machines to the platform device. In examples, the software packages are unpacked, services are generated, and user accounts are set up. It will be appreciated that, in some instances, aspects of operation 306 are performed multiple times to install multiple virtual-network functions as defined by the device configuration.

Flow progresses to operation 308, where network connections are generated. For example, a virtual-network function installed at operation 306 is associated with a physical-network connection of the platform device. As another example, a virtual-network connection is defined between a plurality of virtual-network functions. In examples, a placeholder network connection is generated for a virtual-network function that is yet to be installed (e.g., as may be the case for a custom virtual-network function that will be installed when the platform device is activated on premises as described above).

At operation 310, the management agent and performance manager are installed. For example, the management agent and performance manager may be device-management agent 118 and performance manager 120 in FIGS. 1A and 1B. In examples, the management agent and performance manager are provided in a format similar to that which is used for virtual-network functions (e.g., in a container, as a virtual machine, etc.). It will be appreciated that other management software may be installed in addition to or as an alternative to the disclosed management agent and performance manager.

Moving to operation 312, device-specific cryptographic data is generated. According to aspects described herein, the cryptographic data may enable the platform device to communicate with a service provider. For example, cryptographic keys may be generated, which may later be used to form an IPsec tunnel. The IPsec tunnel may be used to provide performance information (e.g., as may be generated by the performance manager) or the IPsec tunnel may be used to install, remove, or reconfigure virtual-network functions (e.g., as may be performed by the device-management agent). The cryptographic data may also uniquely identify the platform device, thereby enabling the service provider to verify that it is communicating with an authorized platform device. Flow terminates at operation 312.

Figure 3B:
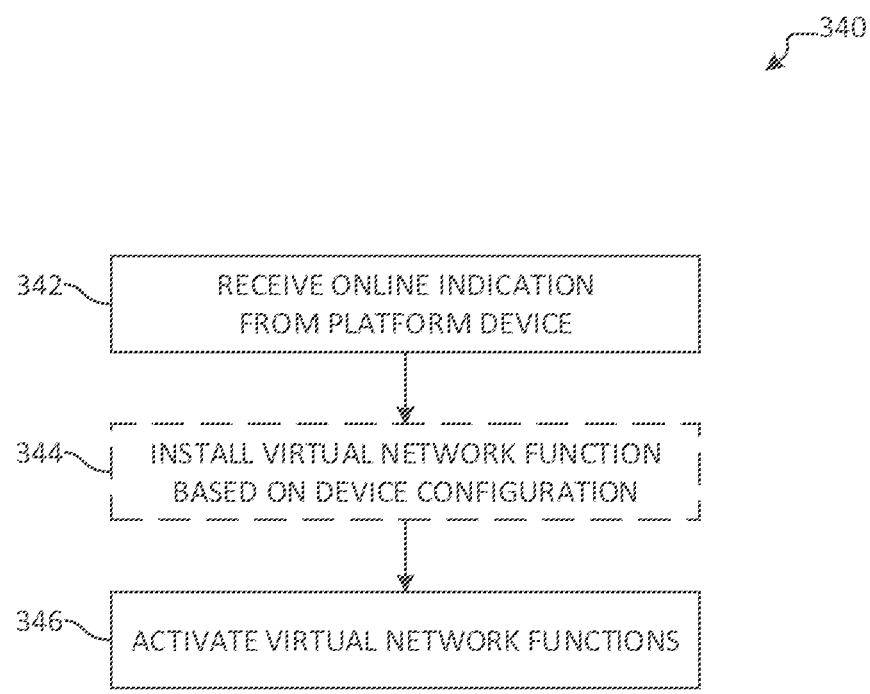
FIG. 3B illustrates an overview of an example method for activating a platform device according to a device configuration.

FIG. 3B illustrates an overview of an example method 340 for activating a platform device according to a device configuration. In examples, aspects of method 340 are performed by a service provider, such as service provider 102 described above in FIGS. 1A and 1B. Method 340 may be performed to activate a platform device once the platform device has been delivered to a user, for example as part of operation 212 of method 200 in FIG. 2A. Method 300 begins at operation 342, where an online indication is received from a platform device. In an example, the online indication is received from a device-management agent of the platform device, such as device-management agent 118 of platform device 104 in FIGS. 1A and 1B. As described herein, the online indication may be received via a tunnel between the platform device and the service provider. The online indication may comprise cryptographic data associated with the platform device, which the service provider uses to verify the identity of the platform device.

In some examples, flow progresses to operation 344, where a virtual-network function is installed based on the device configuration. Operation 344 is illustrated using a dashed box to indicate that, in other examples, operation 344 may be omitted. As described herein, a virtual-network function may be installed once the platform device has been delivered to the user, as may be the case with a custom virtual-network function. The virtual-network function may be installed from a storage device, a data store on a local network, or from the Internet, among other examples.

Moving to operation 346, the virtual-network functions installed on the platform device are activated. In examples, an indication to execute the virtual-network functions using a virtual-network-function engine of the platform device is sent to a device-management agent of the platform device. In some instances, the indication comprises an indication to perform additional configuration steps. For example, configuration information of the platform device may be updated according to detected configuration of the local network or information associated with a virtual-network function that was installed at operation 344. Flow terminates at operation 346.

Figure 4:
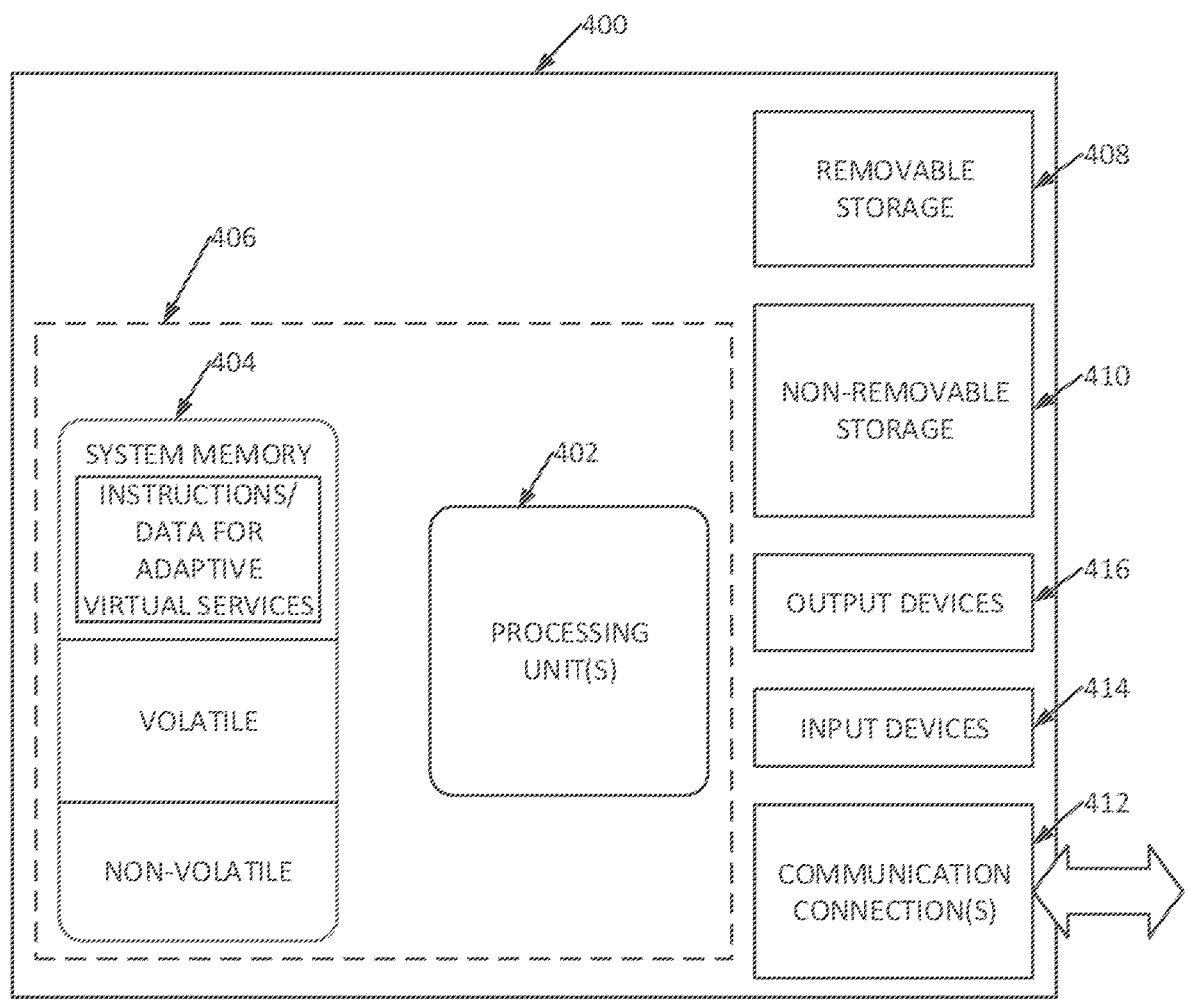
FIG. 4 illustrates an example of a suitable operating environment in which one or more of the present embodiments may be implemented.

FIG. 4 illustrates an example of a suitable operating environment 400 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 400 typically may include at least one processing unit 402 and memory 404. Depending on the exact configuration and type of computing device, memory 404 (storing, among other things, APIs, programs, etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 4 by dashed line 406. Further, environment 400 may also include storage devices (removable, 408, and/or non-removable, 410) including, but not limited to, magnetic or optical disks or tape. Similarly, environment 400 may also have input device(s) 414 such as a keyboard, mouse, pen, voice input, etc. and/or output device(s) 416 such as a display, speakers, printer, etc. Also included in the environment may be one or more communication connections, 412, such as LAN, WAN, point to point, etc.

Operating environment 400 may include at least some form of computer readable media. The computer readable media may be any available media that can be accessed by processing unit 402 or other devices comprising the operating environment. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. The computer storage media may not include communication media.

The communication media may embody computer readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. For example, the communication media may include a wired media such as a wired network or direct-wired connection, and wireless media such as acoustic, RF, infrared and other wireless media. Combinations of the any of the above should also be included within the scope of computer readable media.

The operating environment 400 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in the system memory 404. While executing on the processing unit 402, program modules 408 (e.g., applications, Input/Output (I/O) management, and other utilities) may perform processes including, but not limited to, one or more of the stages of the operational methods described herein such as the methods illustrated in FIGS. 2 and 3A-3B, for example.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 400 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

As will be understood from the foregoing disclosure, one aspect of the technology relates to a system comprising: at least one processor; and memory storing instructions that, when executed by the at least one processor, causes the system to perform a set of operations. The set of operations comprises: receiving, from a user computing device, a device configuration for a platform-device type; evaluating the received device configuration based on the platform-device type to determine whether the device configuration is valid; and based on determining that the device configuration is valid, initializing a platform device associated with the platform-device type based at least in part on the received device configuration. In an example, initializing the platform device comprises: evaluating at least one specification of the platform device using a set of expected specifications to determine whether the at least one specification is valid; based on determining the at least one specification is not valid, reconfiguring the platform device; installing, to the platform device, a virtual-network function specified by the device configuration; providing, to the platform device, an indication to generate a network connection for the virtual-network function; and installing, to the platform device, a management agent. In another example, initializing the platform device further comprises: generating cryptographic data for the platform device; and providing at least a part of the cryptographic data to the platform device. In a further example, the set of operations further comprises: receiving, from the platform device, an online indication; and in response to the online indication, activating the platform device. In yet another example, activating the platform device comprises: providing, to the platform device, an indication to activate the virtual-network function. In a further still example, activating the platform device comprises: providing, to the platform device, an indication to install a custom virtual-network function specified by the device configuration from an on-premises data store. In an example, the set of operations further comprises: receiving, from the user computing device, a changed device configuration for the platform-device type; evaluating the received device configuration based on the platform-device type to determine whether the device configuration is valid; and when the device configuration is valid, providing, to a management agent of the platform device, an indication relating to the changed device configuration.

In another aspect, the technology relates to a method for updating a device configuration of a platform device. The method comprises: receiving, from a user computing device, an updated device configuration for a platform device; evaluating the updated device configuration based on a platform-device type of the platform device to determine whether the updated device configuration is valid; and when the device configuration is valid, providing, to a management agent of the platform device, an indication relating to the updated device configuration. In an example, the indication relating to the updated device configuration is one of: an indication to install a new virtual-network function from a library of available virtual-network functions; an indication to install a custom virtual-network function specified by the device configuration from an on-premises data store; an indication to uninstall an existing virtual-network function;

an indication to define a new network connection; or an indication to remove an existing network connection. In another example, evaluating the received device configuration to determine whether the updated device configuration is valid further comprises determining to use an additional platform device, and wherein the method further comprises: initializing the additional platform based at least in part on the received device configuration; receiving, from the additional platform device, an online indication; and in response to the online indication, activating the additional platform device. In a further example, initializing the additional platform device comprises: evaluating at least one specification of the additional platform device using a set of expected specifications to determine whether the at least one specification is valid; based on determining the at least one specification is not valid, reconfiguring the additional platform device; and installing, to the additional platform device, a second management agent. In yet another example, the updated device configuration relates to a first virtual-network function and a second virtual-network function; the platform device is a first platform device and the additional platform device is a second platform device; and the method further comprises: providing a first indication to the management agent of the first platform device relating to the first virtual-network function; and providing a second indication to the second management agent of the second platform device relating to the second virtual-network function. In a further still example, the indication relating to the updated device configuration is provided to the management agent of the platform device using a tunnel.

In a further aspect, the technology relates to a method for initializing a platform device according to a device configuration. The method comprises: receiving, from a user computing device, a device configuration for a platform-device type; evaluating the received device configuration based on the platform-device type to determine whether the device configuration is valid; and based on determining that the device configuration is valid, initializing a platform device associated with the platform-device type based at least in part on the received device configuration. In an example, initializing the platform device comprises: evaluating at least one specification of the platform device using a set of expected specifications to determine whether the at least one specification is valid; based on determining the at least one specification is not valid, reconfiguring the platform device; installing, to the platform device, a virtual-network function specified by the device configuration; providing, to the platform device, an indication to generate a network connection for the virtual-network function; and installing, to the platform device, a management agent. In another example, initializing the platform device further comprises: generating cryptographic data for the platform device; and providing at least a part of the cryptographic data to the platform device. In a further example, the method further comprises: receiving, from the platform device, an online indication; and in response to the online indication, activating the platform device. In yet another example, activating the platform device comprises: providing, to the platform device, an indication to activate the virtual-network function. In a further still example, activating the platform device comprises: providing, to the platform device, an indication to install a custom virtual-network function specified by the device configuration from an on-premises data store. In an example, the method further comprises: receiving, from the user computing device, a changed device configuration for the platform-device type; evaluating the received device configuration based on the platform-device type to determine whether the device configuration is valid; and when the device configuration is valid, providing, to a management agent of the platform device, an indication relating to the changed device configuration.

This disclosure described some aspects of the present technology with reference to the accompanying drawings, in which only some of the possible embodiments were shown. Other aspects may, however, be embodied in many different forms and should not be construed as limited to the embodiments set forth herein. Rather, these aspects were provided so that this disclosure was thorough and complete and fully conveyed the scope of the possible embodiments to those skilled in the art.

Although specific aspects were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A system comprising:
   at least one processor; and
   memory storing instructions that, when executed by the at least one processor, causes the system to perform a set of operations, the set of operations comprising:
   receiving, from a user computing device, an updated device configuration for a platform device;
   evaluating the updated device configuration based on a platform-device type of the platform device to determine whether the updated device configuration is valid; and
   when the device configuration is valid, providing, to a management agent of the platform device, an indication relating to the updated device configuration, wherein the indication relating to the updated device configuration includes at least an indication to install a custom virtual-network function specified by the device configuration from an on-premises data store.

2. The system of claim 1, wherein the indication relating to the updated device configuration further includes at least one of:
   an indication to install a new virtual-network function from a library of available virtual-network functions;
   an indication to uninstall an existing virtual-network function;
   an indication to define a new network connection; or
   an indication to remove an existing network connection.

3. The system of claim 1, wherein evaluating the received device configuration to determine whether the updated device configuration is valid further comprises determining to use an additional platform device, and wherein the set of operations further comprises:
   initializing the additional platform based at least in part on the received device configuration;
   receiving, from the additional platform device, an online indication; and
   in response to the online indication, activating the additional platform device.

4. The system of claim 3, wherein initializing the additional platform device comprises:
   evaluating at least one specification of the additional platform device using a set of expected specifications to determine whether the at least one specification is valid;

based on determining the at least one specification is not valid, reconfiguring the additional platform device; and installing, to the additional platform device, a second management agent.

5. The system of claim 3, wherein:

the updated device configuration relates to a first virtual-network function and a second virtual-network function;

the platform device is a first platform device and the additional platform device is a second platform device; and the set of operations further comprises:

providing a first indication to the management agent of the first platform device relating to the first virtual-network function; and providing a second indication to the second management agent of the second platform device relating to the second virtual-network function.

6. The system of claim 1, wherein the indication relating to the updated device configuration is provided to the management agent of the platform device using a tunnel.

7. A method for updating a device configuration of a platform device, comprising:

receiving, from a user computing device, an updated device configuration for a platform device;

evaluating the updated device configuration based on a platform-device type of the platform device to determine whether the updated device configuration is valid; and when the device configuration is valid, providing, to a management agent of the platform device, an indication relating to the updated device configuration, wherein the indication relating to the updated device configuration includes at least an indication to install a custom virtual-network function specified by the device configuration from an on-premises data store.

8. The method of claim 7, wherein the indication relating to the updated device configuration further includes at least one of:

an indication to install a new virtual-network function from a library of available virtual-network functions;

an indication to uninstall an existing virtual-network function;

an indication to define a new network connection; or an indication to remove an existing network connection.

9. The method of claim 7, wherein evaluating the received device configuration to determine whether the updated device configuration is valid further comprises determining to use an additional platform device, and wherein the method further comprises:

initializing the additional platform based at least in part on the received device configuration;

receiving, from the additional platform device, an online indication; and in response to the online indication, activating the additional platform device.

10. The method of claim 9, wherein initializing the additional platform device comprises:

evaluating at least one specification of the additional platform device using a set of expected specifications to determine whether the at least one specification is valid;

based on determining the at least one specification is not valid, reconfiguring the additional platform device; and installing, to the additional platform device, a second management agent.

11. The method of claim 9, wherein:

the updated device configuration relates to a first virtual-network function and a second virtual-network function;

the platform device is a first platform device and the additional platform device is a second platform device; and the method further comprises:

providing a first indication to the management agent of the first platform device relating to the first virtual-network function; and providing a second indication to the second management agent of the second platform device relating to the second virtual-network function.

12. The method of claim 7, wherein the indication relating to the updated device configuration is provided to the management agent of the platform device using a tunnel.

* * * * *